(12) United States Patent
Andersson et al.

(10) Patent No.: US 6,292,161 B1
(45) Date of Patent: *Sep. 18, 2001

(54) MULTIPLE DISPLAY BLINK SCHEME FOR INTEGRATED CIRCUIT WITH APPLICATION SENSE

(75) Inventors: Ralph E. Andersson, Grass Valley; Steven R. Kubes, El Dorado Hills; Stephen M. McConnell, Folsom, all of CA (US)

(73) Assignee: Level One Communications, Inc., Sacramento, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,515

(22) Filed: Dec. 16, 1996

Related U.S. Application Data

(63) Continuation of application No. 08/437,576, filed on May 9, 1995, now abandoned.

(51) Int. Cl.[7] ........................................................ G09G 3/32
(52) U.S. Cl. .......................... 345/82; 340/815.45; 345/83; 345/39
(58) Field of Search ................................. 345/82–83, 39, 345/42, 44, 46, 55, 211, 30–32, 204; 340/825.32, 825.82, 815.42, 815.45; 327/108, 514; 375/211, 213

(56) References Cited

U.S. PATENT DOCUMENTS

| | | |
|---|---|---|
| 4,490,688 | 12/1984 | Borras et al. . |
| 4,680,577 | 7/1987 | Straayer et al. . |
| 4,907,225 | 3/1990 | Gulick et al. . |
| 5,265,123 | 11/1993 | Vijeh et al. . |
| 5,666,129 | * 9/1997 | Wurster et al. ...................... 345/83 |

OTHER PUBLICATIONS

Semiconductor Reference Guide, 1985 Edition, Radio Shack, A Division of Tandy Corporation, pp. 38–40, 1984.*
Advanced Micro Devices, Advance Release Data Sheet for Am79C98; Twisted Pair Ethernet Tranceiver (TPEX), Mar. 1990.
AT&T, Preliminiary Data Sheet for T7201; Multi–Port Repeater Unit (MPR2), Jun. 1990.
AT&T, Preliminary Data Sheet for T7220; Twisted Pair Medium Attachment Unit (TPMAU), Apr. 1989.
Level One, Preliminary Information Standard Product for LXT902; Ethernet Twisted–Pair Media Attachment Unit, Jul.1990.

(List continued on next page.)

Primary Examiner—Richard Hjerpe
Assistant Examiner—Francess Nguyen
(74) Attorney, Agent, or Firm—Merchant & Gould P.C.

(57) ABSTRACT

A system operable with any number of different display truth table schemes. The system allows a user to select the truth table scheme and a driver circuit is used to drive either a single or pair of display elements. A binary application select detects a logic 0 if an application sense pin is left floating or is pulled low with a resistor. It detects a logic 1 if the application sense pin is pulled high with a resistor. The sense potential is such that all applications at the pin following reset, namely input or output with connected components will only detect a logic 1 when the pin is pulled high by a pull-up resistor. The output latched application is directed to a responsive circuit operable in a first condition when a logic 0 is detected, and a second condition when a logic 1 is detected. A binary select allows $2^n$ different truth schemes to be selected where n is the number of pins used to select the application. When a first binary code is sensed, a first truth table is implemented. When a second binary code is existent, a second truth table is implemented and so on. The driver, sensor and responsive circuit are formed as an integrated circuit device.

11 Claims, 7 Drawing Sheets

OTHER PUBLICATIONS

Level One, Preliminary Information Standerd Product for LXT903; 10Base–T Hub Transceiver, Aug. 1990.

Micro Linear, Advanced Information for ML4651, ML4652; 10Base–T Transceiver, Feb. 1990.

Micro Linear, Advanced Information for ML4653; 10Base–T Transceiver for Multi–Port Repeaters, Sep. 1989.

National Semiconductor, Preliminary for DP83950A Repeater Interface Controller (RIC); Sep. 1991.

National Semiconductor, Preliminary for DP83955/ DP83956; LitE End Repeater Interface Controller (LERIC™), May 1992.

* cited by examiner

FIG. 3

| LEDM1 | SDOUT/LEDM0 | Application |
|---|---|---|
| 0 | 0 | default |
| 0 | 1 | 1 |
| 1 | 0 | 2 |
| 1 | 1 | 3 |

FIG. 4

| Condition | LEDTP1-4 | LEDAUI | LEDCF | LEDJM |
|---|---|---|---|---|
| 1 | Rx Link Pulse | N/A | FIFO Error | Manchester Code Violation |
| 2 | Tx Packet | Tx Packet | N/A | N/A |
| 3 | Reversed Polarity | N/A | Collision | MAU Jabber Lockup Prot. |
| 4 | Rx Packet | Rx Packet | N/A | N/A |
| 5 | Partitioned Out | Partitioned Out | N/A | N/A |

FIG. 5

| Condition | LEDTP1-4 | LEDAUI | LEDCF | LEDJM |
|---|---|---|---|---|
| 1 | Rx Link Pulse | N/A | MAU Jabber Lockup Prot. | N/A |
| 2 | N/A | N/A | N/A | N/A |
| 3 | N/A | N/A | Collision | N/A |
| 4 | Rx Packet | Rx Packet | N/A | N/A |
| 5 | N/A | N/A | N/A | N/A |

FIG. 6

| Condition | LEDTP1-4 | LEDAUI | LEDCF | LEDJM |
|---|---|---|---|---|
| 1 | Rx Link Pulse | N/A | MAU Jabber Lockup Prot. | N/A |
| 2 | Partitioned Out | Partitioned Out | N/A | N/A |
| 3 | N/A | N/A | Collision | N/A |
| 4 | Rx Packet | Rx Packet | N/A | N/A |
| 5 | N/A | N/A | N/A | N/A |

FIG. 7

| Condition | LEDTP1-4 | LEDAUI | LEDCF | LEDJM |
|---|---|---|---|---|
| 1 | Rx Link Pulse | N/A | MAU Jabber Lockup Prot. | N/A |
| 2 | Rx Packet | Rx Packet | N/A | N/A |
| 3 | Partitioned Out | Partitioned Out | Collision | N/A |
| 4 | N/A | N/A | N/A | N/A |
| 5 | N/A | N/A | N/A | N/A |

MULTIPLE DISPLAY BLINK SCHEME FOR INTEGRATED CIRCUIT WITH APPLICATION SENSE

This is a Continuation of application Ser. No. 08/437,576, filed May 9, 1995 now abandoned.

BACKGROUND OF THE INVENTION

1. Field of the Invention.

This invention relates in general to a circuit for operating display elements, and more particularly, to an integrated circuit having selectable multiple display blink schemes or truths with a minimum of external components.

2. Description of Related Art.

This invention provides for the selection of multiple display blink schemes for conveying information about the operation of an integrated circuit. In the marketing of highly-integrated, application-specific integrated circuits, it is becoming increasingly difficult to target the needs of all customers. To successfully sell a product in today's competitive marketplace, a chip manufacturer must create a distinct "feel" to their product through its form and function. Manufacturers of system level products try to distinguish their product from a competitor's by appearance and function. As levels of chip integration increase, this becomes harder and harder to do for a system designer.

One way of creating a distinct "feel" to a chip is to design in flexibility. An integrated circuit manufacturer can attempt to anticipate all of the demands of its customers by designing multiple modes of operation into their chip. These modes are usually selected through configuration pins which are dedicated to mode selection. Thus, some pins may be used for mode selection during normal operation of the chip. On many highly integrated devices there are very few pins left unconnected or not used for some input or output function. Hence it is often times difficult to justify the tradeoff between functional pins and configuration pins.

In some of these types of chips, LEDs are used to convey information to the user. Accordingly, it would be useful for a system designer to distinguish their product by altering the LED blink scheme. Further, it would be desirable to have a mode selection pin which may be configured to change the truth table of the LEDs, i.e., how they blink to indicate the various operational conditions.

Further, a single LED can be used to display three different states: on, off or blinking. Thus, a dual LED can display a large amount of data using only a single pin of an integrated circuit (IC) as described in Application Ser. No. 08/271,111, filed Jul. 6, 1994 (U.S. Pat. No. 5,166,129), herein incorporated by reference. Trying to visually interpret all the information present, however, is difficult as it is possible to encode up to five states with a dual LED. Each user of the integrated circuit might also want to distinguish their product by changing the manner in which data is displayed to the user.

It is accordingly desirable to have an arrangement where multiple LED truth table schemes can be used with the integrated circuit device without reconfiguring the IC device or providing unique devices for the different situations.

It can be seen that there is a need for multiple blink schemes designed into an IC.

It can also be seen that there is a need for providing the selection of an LED blink scheme using external signals.

There is accordingly a need to provide a system for operating with a different number of display modes and yet be efficient from a logic and circuitry perspective.

SUMMARY OF THE INVENTION

To overcome the limitations in the prior art described above, and to overcome other limitations that will become apparent upon reading and understanding the present specification, the present invention discloses a system operable with any number of different display truth table schemes.

According to the invention, there is provided a circuit for operating a user selected display truth table scheme. There is a driver circuit which can be used to drive either a single or pair of display elements.

A binary application select detects a logic 0 if an application sense pin is left floating or is pulled low with a resistor. It detects a logic 1 if the application sense pin is pulled high with a resistor. The sense potential is such that all applications at the pin following reset, namely input or output with connected components will only detect a logic 1 when the pin is pulled high by a pull-up resistor.

The output latched application is directed to a responsive circuit operable in a first condition when a logic 0 is detected, and a second condition when a logic 1 is detected.

A binary select allows $2^n$ different truth schemes to be selected where n is the number of pins used to select the application. The pins used to select the application are not used solely to configure the application. After the desired application is sensed, the pin goes on to serve another input or output function which is not necessarily associated with the application that was just selected. When a first binary code is sensed, a first truth table is implemented. When a second binary code is existent, a second truth table is implemented and so on.

Preferably, the driver, sensor and responsive circuit are formed as an integrated circuit device.

The invention is directed to the circuit and method for operating multiple blink schemes via a single pin driving a single or pair of display elements.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a truth table defining the application select for an integrated circuit in accordance with the invention;

FIG. 4 illustrates the blink truth for the LEDs in a default configuration;

FIG. 5 illustrates the blink truth for the LEDs for a first application;

FIG. 6 illustrates the blink truth for the LEDs for a second application; and

FIG. 7 illustrates the blink truth for the LEDs for a third application.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1A:
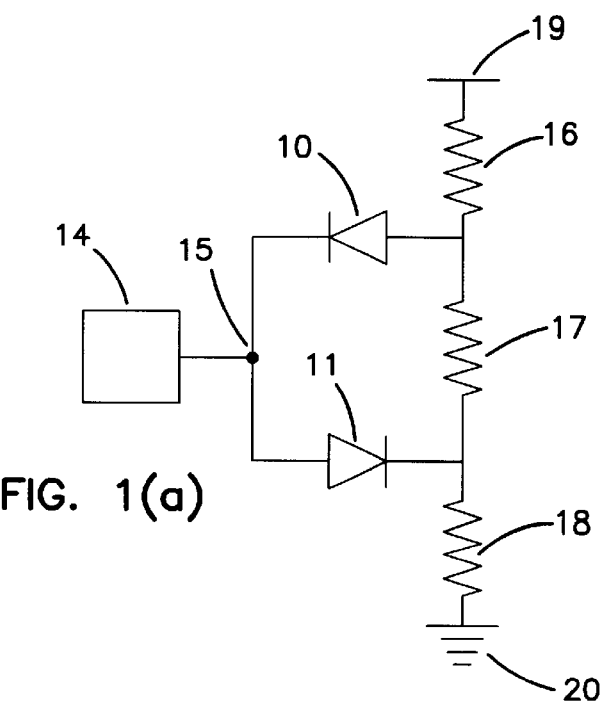
FIGS. 1(a)–(c) illustrate a circuit according to the invention for operating electrical display elements in accordance with the invention.
Figure 1B:
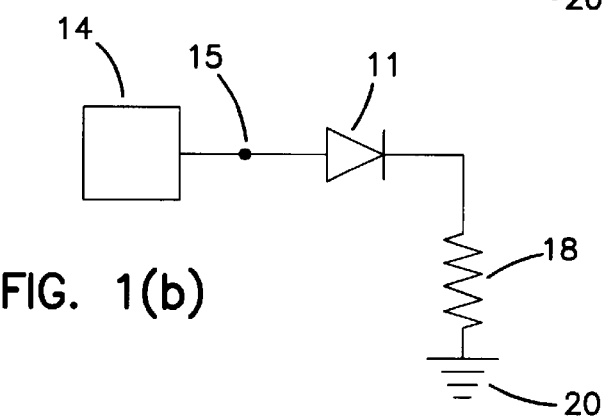
Figure 1C:
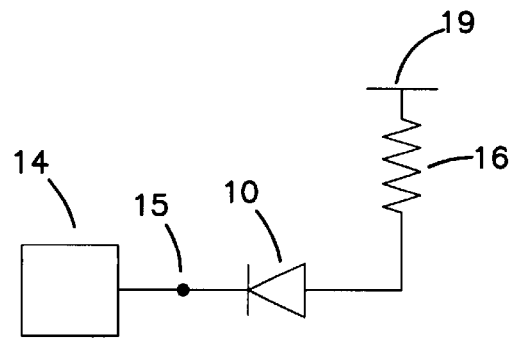

FIGS. 1(a)–1(c) illustrate a circuit for operating electrical display elements 10 and 11. An LED driver is connected through input/output terminal 15 to the display devices 10 and 11. As illustrated in FIGS. 1(a)–1(c), the display devices 10 and 11 are oppositely poled.

The driver circuit 14 for each of the pair of display elements 10 and 11 is a tri-state buffer.

The LED display elements 10 and 11 are connected with two current-limiting resistors 16 and 18 and resistor 17 used for biasing. As indicated in FIG. 1(a), resistor 16 would have a resistance of 820 ohms, resistor 17 would have a resistance of 470 ohms and resistor 18 would have a resistance of 820 ohms. Resistor 16 is connected to a high-voltage level, $V_{cc}$, of 5 volts through line 19 and resistor 18 is connected to a low-voltage level, namely ground 20. In the tri-state mode, the voltage at terminal 15 is at some intermediate point between $V_{cc}$ and ground.

In FIG. 1(b) there is illustrated a single LED device 11 with a current limiting resistor 18 connected with ground 20. In FIG. 1(c) there is illustrated a single LED device 10 with a current limiting resistor 16 connected with high voltage level 19.

The voltage at node 15 when there are two LEDs connected as illustrated in FIG. 1(a) can be at one of the three states, namely high level, high impedance and low level. For the case where the high level is placed at node 15, device 11 is turned on. The low level turns on device 10. The high impedance mode will turn both devices 10 and 11 off. This allows one, both or neither device to be turned on in a manner which is apparent to the observer. In the arrangement where there is a single LED connected with the node 15, as shown in FIG. 1(b), there is not a need to turn off a second device, and hence only two voltage or logic levels are necessary to illuminate device 11. High level and high impedance or high level and low level will both achieve the same result. The voltage varies only between the zero and the high-voltage level according to conditions whether the LED device is conducting or nonconducting.

As illustrated in FIG. 1(c) it is also possible to use device 10 alone without associated resistors 17 and 18. The logic level is low to turn on or light the display device 10 and high impedance or high level to turn off the display device 10.

The LED pin for application sense is also used for an unassociated function, e.g., LEDJM pin selects the AUI circuit mode. There is provided a sensor for measuring the potential associated with node 15 of an output pin, SDOUT/LEDM0 and pin LEDM1. In this manner, there is provided a signal for determining whether a pull-up resistor is attached to these two pins. This is effectively achieved by sensing whether or not the voltage at the node 15 of these two pins is consistent with that which would be found when a pull-up is present.

Figure 2:
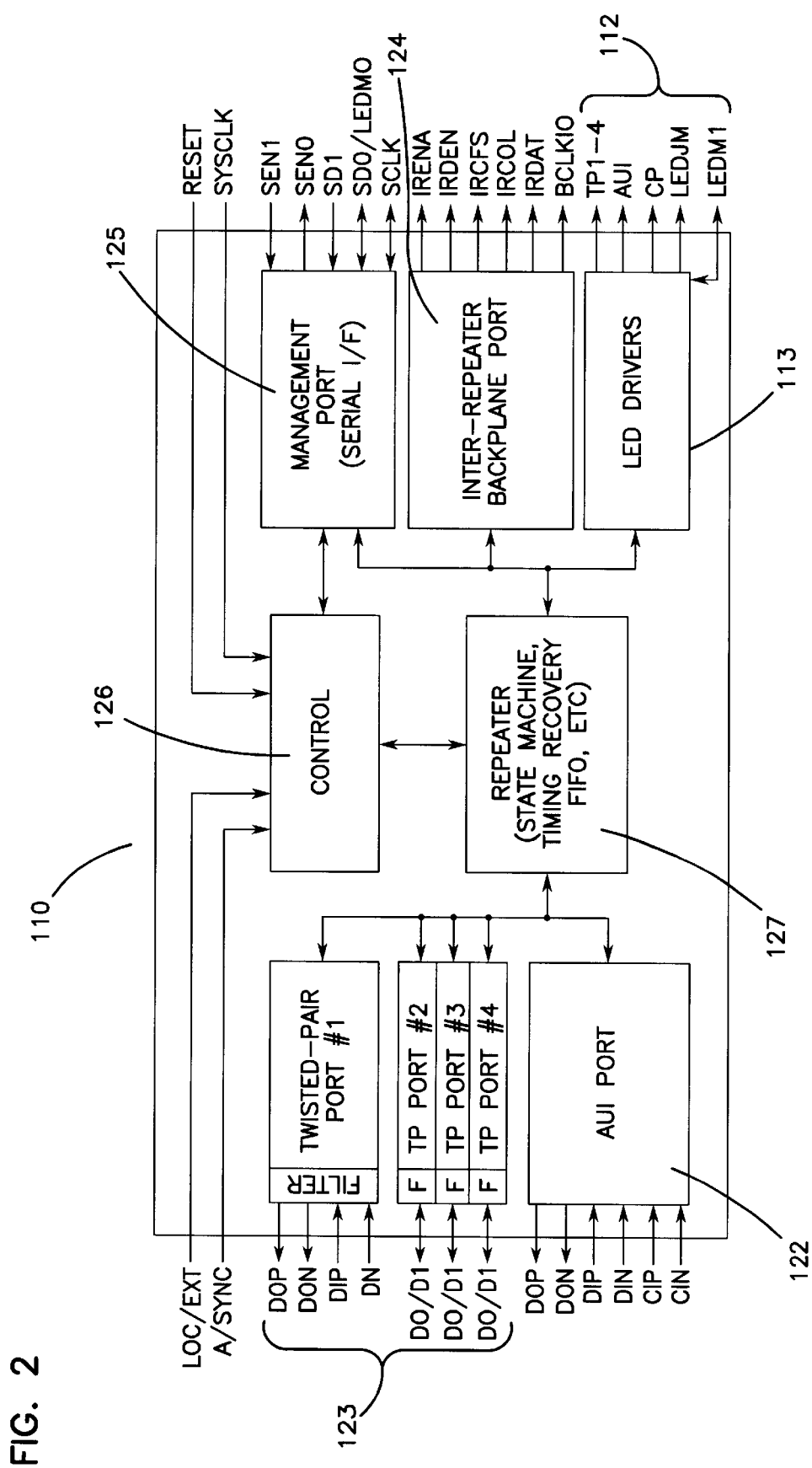
FIG. 2 is a block schematic of an integrated circuit repeater device having multiple blink schemes in accordance with the invention.

A chip 110 which may be modified in accordance with the invention is illustrated in detail in FIG. 2. In the preferred embodiment, chip 110 is an integrated multiport repeater designed for mixed media networks. The chip provides all the active circuitry required for a repeater function in a single CMOS device. It includes an attachment unit interface (AUI) 122 and four 10-base T receivers 123. The AUI port allows for connection of an external transceiver or a drop cable. The transceivers 123, are self-contained and require no external filters. There is an inter-repeater backplane interface 124 for allowing a multitude of 10-base T ports ($\geq 128$) to be cascaded together. Additionally, there is a serial port 125 for providing information for network management. In the preferred embodiment, seven LED pairs 112 are provided as an integrated unit in the LED driver section 113. There is a control portion 126 provided for the chip and a repeater 127, timing recovery and FIFO of the chip.

The relationship of the seven LED driver pin descriptions with regard to the integrated circuit repeater chip 110 is set out in more detail as follows:

LED Driver Pin Descriptions

| Symbol | Name | Description |
| --- | --- | --- |
| LEDCF | Collision & FIFO Error LED Driver | Reports collisions and FIFO errors. When this pin is connected to the anode of one LED and to the cathode of a second LED, the device simultaneously monitors and reports both conditions independently. |
| LEDJM/ (DTE/ MAU) | Jabber/MJLP & Manchester Code Violation LED Driver | When any of the three possible LED configurations, as illustrated in FIGS. 1(a)–1(c), are attached or left unconnected to this pin, the 914 will report jabber and code violations. It pulses low to report MAU Jabber Lockup Protection (MJLP), and pulses high to report manchester code violations. When this pin is connected to the anode of one LED and to the cathode of a second LED, the device simultaneously monitors and reports both conditions independently. When pulled high with a pull-up resistor, this pin is disabled and MAU mode is selected for AUI port. |
| LEDTP1 LEDTP2 LEDTP3 LEDTP4 | TP Port LED Drivers | An alternating pulsed output reports TP port status. Each pin should be tied to a pair of LEDs (to the anode of one LED and the cathode of a second LED). When connected this way, each pin reports five separate conditions (receive, transmit, link integrity, reverse polarity and auto partition) |
| LEDAUI | AUI Port LED Driver | An alternating pulsed output reports AUI port status. This pin should be tied to a pair of LEDs (to the anode of one LED and the cathode of a second LED). When connected this way, this pin reports three separate conditions (receive, transmit, and auto partition) |

An integrated circuit, modified in terms of the invention, allows the user to implement three LED blink schemes in addition to a default blink scheme.

According to the preferred embodiment of the invention, an LED application is sensed following reset and the operation of the circuit is accordingly altered before any signals appear at the output of the device.

The LED application sense uses the SDOUT/LEDM0 pin and LEDM1 pin for the binary select of the four applications. The application will be detected after reset by the logic level present at the application select pin. During this sense period following reset, the output of the pins with functions other than for sensing will be placed in high impedance mode. However, those skilled in the art will recognize that dedicated selection pins could be used to select LED truth tables.

SDOUT/LEDM0 pin and LEDM1 pin will have pull-downs internal to the integrated circuit. To select an application, the LEDM1 pin can be tied high or pulled up by a resistor to select a logic high, left floating, or tied low to or pulled down by a resistor to select a logic low. The SDOUT/LEDM0 pin, on the other hand, uses a pull-up or pull-down resistor to select a logic high or low.

In the preferred embodiment of a chip implementing the multiple blink scheme according to the invention, following the completion of the application sense, the SDOUT/LEDM0 pin will resume its normal function as an output. For this reason SDOUT/LEDM0 cannot be directly tied high or low.

Multiple LED Blink Schemes

FIG. 3 illustrates a truth table 200 defining the application 210 select for an integrated circuit modified in terms of the invention. The application 210 in truth table 200 is selected using the ground (LEDM1) pin 220 and the SDOUT/LEDM0 pin 230. The binary logic levels at these two pins during reset establishes a two-bit logic signal. Using the two pins, four applications can be selected: default 212, application one 214, application two 216, and application three 218. The two-bit binary signal 00 232 selects the default application 212. The two-bit binary signal 01 234 selects application one 214. The two-bit binary signal 10 236 selects application two 216. Finally, the two-bit binary signal 11 238 selects application three 218.

Default Application

FIG. 4 illustrates the Blink Truth 400 for the seven LED pairs 402, 404, 406, 408 in the default configuration. In the descriptions that follow, condition one 410 refers to a solid display of LED1 of a two LED display. Condition two 412 has LED1 blinking, condition three 414 has LED2 solid, condition four 416 has LED2 blinking and condition five 418 has both LED1 and LED2 blinking 180 degrees out of phase. The description of conditions one-five (blink or solid information) apply to all of the LED applications.

In condition one 410, the LED pairs for reporting TP port status 402 signifies receipt of link pulse. The LED pair for reporting AUI port status 404 does not receive a drive signal. The LED pair for reporting collisions and FIFO errors 406 signifies a FIFO error. The LED pair for reporting jabber and code violations 408 signals a Manchester code violation.

In condition two 412, the LED pairs for reporting TP port status 402 signifies receipt of a packet. The LED pair for reporting AUI port status 404 signals receipt of the packet. The LED pair for reporting collisions and FIFO errors 406 does not receive a drive signal. The LED pair for reporting jabber and code violations 408 also does not receive a drive signal.

In condition three 414, the LED pairs for reporting TP port status 402 signals reverse polarity. The LED pair for reporting AUI port status 404 does not receive a drive signal. The LED pair for reporting collisions and FIFO errors 406 signals a collision. The LED pair for reporting jabber and code violations 408 signals MAU Jabber lockup protection.

In condition four 416, the LED pairs for reporting TP port status 402 signals receipt of a packet. The LED pair for reporting AUI port status 404 also signals receipt of a packet. Neither the LED pair for reporting collisions and FIFO errors 406 nor the LED pair for reporting jabber and code violations 408 receives a drive signal.

Finally, in condition five 418, the LED pairs for reporting TP port status 402 signals partitioning. The LED pair for reporting AUI port status 404 also signals partitioning. Neither the LED pair for reporting collisions and FIFO errors 406 nor the LED pair for reporting jabber and code violations 408 receives a drive signal.

To select the default LED blink scheme, the SDOUT/LEDM0 pin is floated or pulled low with a resistor and the LEDM1 pin is pulled low with a resistor or tied directly low or the LEDM1 pin may be left floating. SDOUT/LEDM1 must use only pull up or pull down resistors and cannot be tied directly high or low. This is because, in the preferred embodiment, it functions as an output during normal, non-sense, periods of operation.

The chip when displaying conditions one and two will pull the LED pin high for 4 ms and then place the output driver in high impedance mode for another 4 ms while the LED is lit, or perceived by the eye to be lit. The same is true of conditions three and four except those conditions transition between a low voltage and the high impedance mode. The result for a solid lit condition is an LED being turned on and off at a frequency of 125 Hz, a frequency which is not perceptible to the human eye.

Note conditions two and four have priority over one and three respectively, i.e., you can't be solid and blink at same time, hence you blink. One or two can coexist with three or four, however condition five may not coexist with other conditions. Conditions two, four and five in addition to the 125 Hz blink frequency are gated with a lower frequency. This results in a blink which is visually apparent to the human eye. When conditions two and four occur concurrently, they will blink 90° out of phase with respect to each other. In condition five both LEDs blink 180° out of phase with respect to each other. Conditions two and four blink at 2 Hz, condition five, at 5.3 Hz.

Application 1

When the SDOUT/LEDM0 pin is pulled high by a pull-up resistor and the LEDM1 pin is tied, floated, or pulled low, application 1 is selected. This display is shown in FIG. 5. There are no priorities needed for this application.

In condition one 510, the LED pairs for reporting TP port status 502 signifies receipt of link pulse. The LED pair for reporting AUI port status 504 does not receive a drive signal. The LED pair for reporting collisions and FIFO errors 506 signifies MAU Jabber lockup protection. The LED pair for reporting jabber and code violations 508 does not receive a drive signal.

In condition two 512, none of the LED pairs receive a drive signal. In condition three 514, only the LED pair for reporting collisions and FIFO errors 506 receives a drive signal and that is to signify a collision.

In condition four 516, the LED pairs for reporting TP port status 502 signals receipt of a packet. The LED pair for reporting AUI port status 504 also signals receipt of a packet. Neither the LED pair for reporting collisions and FIFO errors 506 nor the LED pair for reporting jabber and code violations 508 receives a drive signal. Finally, in condition five 518, none of the LED pairs receive a drive signal.

For LEDAUI, Rx Packet is only for incoming data and not for data looped back by a MAU. Rx Packet events blink at 2 Hz.

Application 2

When the SDOUT/LEDM0 pin is pulled low by a pull-down resistor or left floating and pin LEDM1 is tied or pulled high with a pull-up, application 2 is selected. This display is shown in FIG. 6.

In condition one 610, the LED pairs for reporting TP port status 602 signifies receipt of link pulse. The LED pair for reporting AUI port status 604 does not receive a drive signal. The LED pair for reporting collisions and FIFO errors 606 signifies MAU Jabber lockup protection. The LED pair for reporting jabber and code violations 608 does not receive a drive signal.

In condition two 612, the LED pairs for reporting TP port status 602 signifies partitioning. The LED pair for reporting AUI port status 604 also signals partitioning. The LED pair for reporting collisions and FIFO errors 606 does not receive a drive signal. The LED pair for reporting jabber and code violations 608 also does not receive a drive signal.

In condition three 614, only the LED pair for reporting collisions and FIFO errors 606 receives a signal and that is to signal a collision.

In condition four 616, the LED pairs for reporting TP port status 602 signals receipt of a packet. The LED pair for reporting AUI port status 604 also signals receipt of a packet. Neither the LED pair for reporting collisions and FIFO errors 606 nor the LED pair for reporting jabber and code violations 608 receive a drive signal.

Finally, in condition five 618, none of the LED pairs receive a drive signal.

For LEDAUI Rx Packet is only for incoming data and not for data looped back by a MAU. Rx Packet and Auto-Partition events both blink at 2 Hz. Auto-Partition on a port precludes Rx Packet event from occurring on the LED.

Application 3

When the SDOUT/LEDM0 pin is pulled high by a pull-up resistor and the LEDM1 pin is tied or pulled high, application 3 is selected. This display is shown in FIG. 7.

In condition one 710, the LED pairs for reporting TP port status 702 signifies receipt of link pulse. The LED pair for reporting AUI port status 704 does not receive a drive signal. The LED pair for reporting collisions and FIFO errors 706 signals MAU Jabber lockup protection. The LED pair for reporting jabber and code violations 708 does not receive a drive signal.

In condition two 712, the LED pairs for reporting TP port status 702 signifies receipt of a packet. The LED pair for reporting AUI port status 704 also signals receipt of the packet. The LED pair for reporting collisions and FIFO errors 706 does not receive a drive signal. The LED pair for reporting jabber and code violations 708 also does not receive a drive signal.

In condition three 714, the LED pairs for reporting TP port status 702 signals partitioning. The LED pair for reporting AUI port status 704 also signals partitioning. The LED pair for reporting collisions and FIFO errors 706 signals a collision. The LED pair for reporting jabber and code violations 708 does not receive a drive signal.

In conditions four 716 and five 718, none of the LED pairs receive drive signals.

For LEDAUI Rx Packet is only for incoming data and not for data looped back by a MAU. Rx Packet event blinks at 2 Hz. Auto-Partition on a port precludes Rx Packet event from occurring on the LED.

SUMMARY

According to the invention, the LED blink scheme for conveying information to the user may be altered. A mode selection pin may be configured to change the truth table of the LEDs. During reset of the chip, the pull-up resistor is detected by the application select and the appropriate changes are made to the LED function. A binary select allows $2^n$ different truth schemes to be selected where n is the number of pins used to select the application. When a first binary code is sensed, a first truth table is implemented. When a second binary code is existent, a second truth table is implemented and so on.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A circuit for operating a plurality of display elements, comprising:

a driver circuit for driving the plurality of display elements, the display elements comprising a plurality of display conditions;

a truth table, operatively coupled to the driver circuit, the truth table defining a plurality of display applications, each display application defining a blink scheme for the pair of display elements, and wherein the plurality of display conditions of the display elements provide an independent status indication for each of the plurality of display applications; and a plurality of select pins to select one of the plurality of display applications, operatively coupled to the truth table, the application being selected by adjusting a potential representing one of the display applications, at least one of the select pins having a normal circuit function unassociated with the display applications.

2. The circuit of claim 1, wherein the display elements are LEDs.

3. The circuit of claim 2, wherein the LED display elements comprising five display conditions, the truth table defining four display applications.

4. The circuit of claim 1, wherein the select pins comprises two select pins, the normal circuit function unassociated with the display applications comprises that at least one of the pins is capable of functioning as an output of the circuit, such that the pin is capable of functioning as the output of the circuit as well as functioning as a selection for the plurality of display applications of the circuit.

5. The circuit of claim 4, further comprising a circuit operatively coupled to the two pins to adjust the potential of at least one of the select pins.

6. The circuit of claim 5, wherein the circuit comprises an external resistor to adjust the potential of at least one of the select pins.

7. The circuit of claim 6, further comprising a sensor to sense the display applications by determining a logic level at the select pin.

8. The circuit of claim 7, further comprising, for at least one of the select pins, at least one pull-up resistor to select a logic high.

9. The circuit of claim 7, further comprising, for at least one of the select pins, at least one pull-down resistor to select a logic low.

10. The circuit of claim 7, further comprising a floating pin to select a logic low.

11. The circuit of claim 7, further comprising an input to an external logic device to select a logic low.

* * * * *